UNITED STATES PATENT OFFICE.

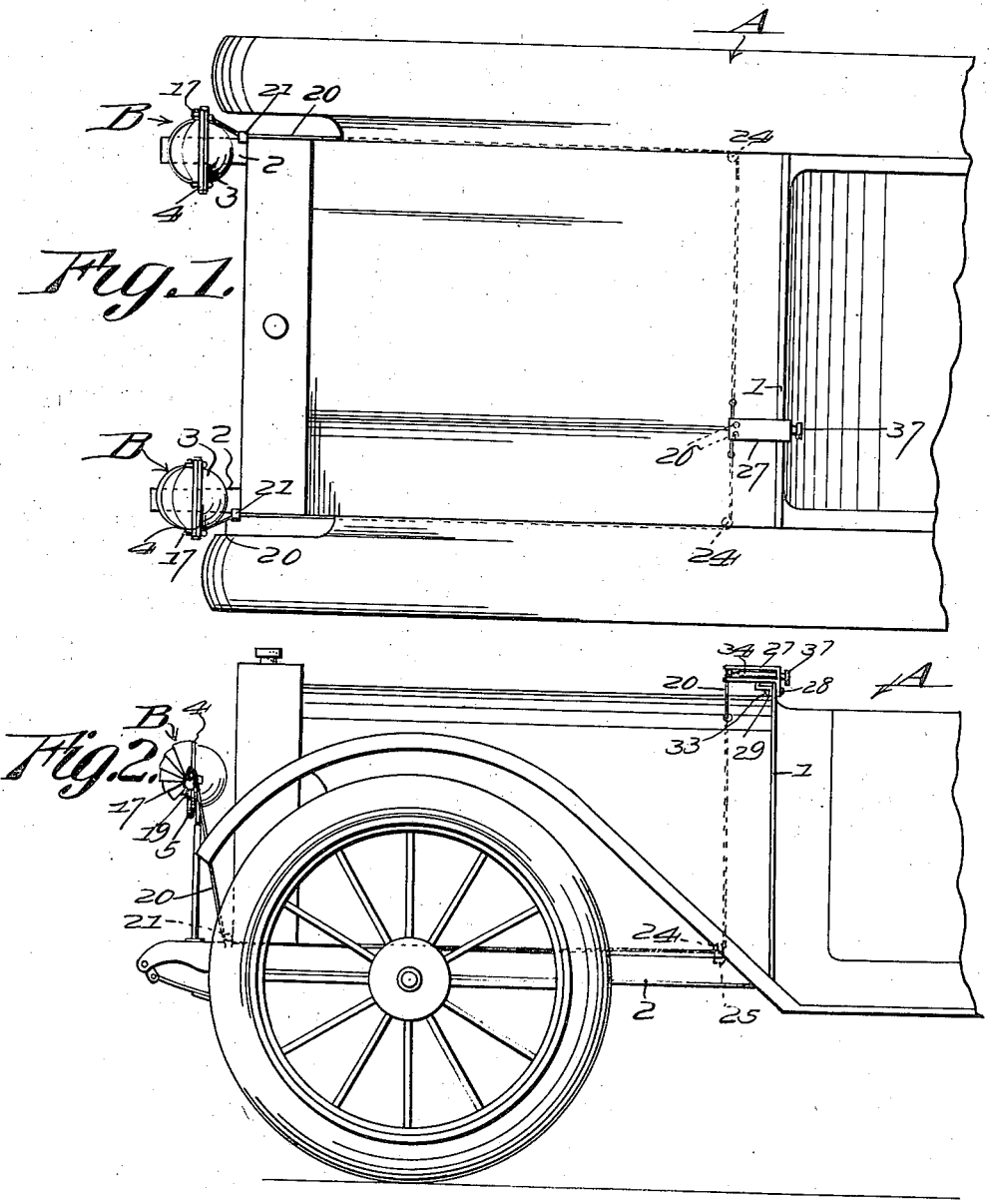

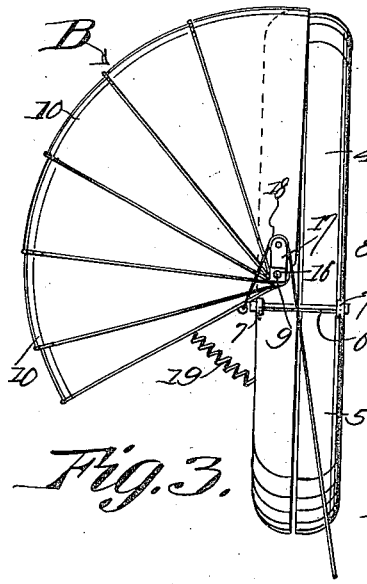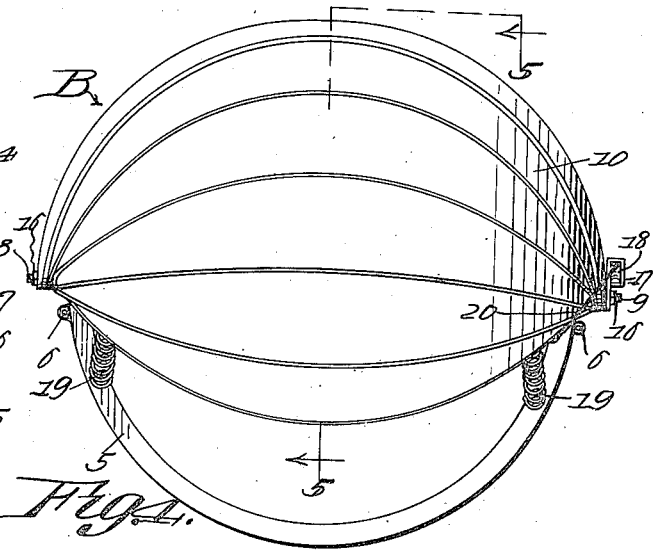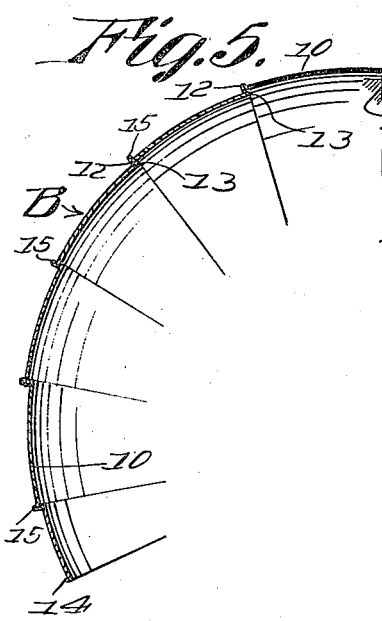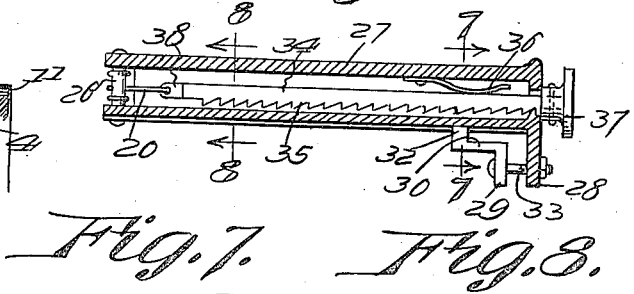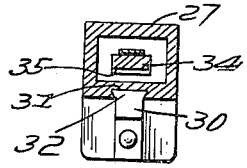

FELIX BRISBOIS, OF MAHNOMEN, AND JOHN VINCENT KING, OF WAUBUN, MINNESOTA.

HEADLIGHT-SHIELD.

1,326,017.	Specification of Letters Patent.	Patented Dec. 23, 1919.

Application filed May 25, 1918. Serial No. 236,501.

*To all whom it may concern:*

Be it known that we, FELIX BRISBOIS and JOHN V. KING, citizens of the United States, residing at Mahnomen and Waubun, respectively, in the county of Mahnomen and State of Minnesota, have invented new and useful Improvements in Headlight-Shields, of which the following is a specification.

The invention relates in general to attachments for auto vehicle lights, and its principal object is to provide a folding shield for such lights together with operating means for attachment to the dash of a vehicle, whereby the shield may be extended to shroud the light or fold it up into a position, so that the full glare of the light may be obtained.

Another object of the invention seeks the provision of a unique means for attaching the shield to the headlight of a vehicle.

Still another object is to provide a device of this character, which is simple in construction, durable and effective in operation, and inexpensive to manufacture.

Still other and further objects appear in the detailed description which follows.

The drawings illustrate and the specification describes a particular embodiment of the invention, but to this embodiment, the invention is not to be restricted. The actual reduction to practice may suggest certain desirable changes or alterations, and the right is claimed to make any which do not deviate from the scope of the annexed claims.

In the accompanying drawings:

Figure 1 is a plan view showing the application of the invention,

Fig. 2 is a side elevation of the structure shown in Fig. 1,

Fig. 3 is an enlarged side elevation of the shield *per se.*

Fig. 4 is a front elevation of the structure of Fig. 3,

Fig. 5 is a section on the line 5—5 of Fig. 4,

Fig. 6 is a longitudinal sectional view through the device by means of which the shield is operated, Fig. 7 is a section on the line 7—7 of Fig. 6, Fig. 8 is a section on the line 8—8 of Fig. 6.

Fig. 9 is a side elevation of one of the pulleys and its attendant support.

Referring to the drawings, there is shown a portion A of an auto vehicle body having the front dash 1, the chassis frame 2 and the lamps 3. The shield B is designed for application to the lamps 3 and to that end is provided with rings comprising semi-circular sections 4 and 5, each ring comprising two of these sections, and the two rings coöperating to effect the attachment of the shield to the bezel of the lamps. One of the rings lies against the front of the bezel, and one against the rear, and the two are held firmly together, and the two sections 4 and 5 of each are connected by means of bolts 6 which pass through suitable eyes formed in ears 7 which are made integral parts of each section. The front ring has its section 4 provided with studs 8 and 9 which extend in radial directions, and are so positioned that they stand on diametrically opposite sides of the ring as a whole, and obtain near the points where the two sections of the ring connect together. The studs 8 and 9 are designed as means on which the folding shield comprising sections 10 may be mounted. The sections 10 are made arcuate in shape and at their ends are provided with appropriate holes so that they may effect pivotal engagement with the studs 8 and 9. The topmost section 10 is provided on its rear edge with an inturned flange 11 designed to lie against the back edge of the section 4 of the forward ring, and at its forward edge is provided with an inturned flange 12 with which an upturned flange 13 formed on the rear edge of the next succeeding section 10 engages. This next succeeding section similarly has an inturned flange 13 on its forward edge for engagement with the upturned flange 12 of the next succeeding section, this construction obtaining throughout the several sections to the foremost or bottom section 10, which omits the inwardly or downwardly turned flange on its forward edge, but which is provided thereon with an upturned flange 14. All of the sections 10 between the foremost and the rearmost section are provided with upstanding flanges 15 on their forward edges. All of the sections are so proportioned that the foremost section may be moved back within the preceding section, and the two within the next preceding section, and so on until all of the sections are held one within the other, the flanges 14 and 15 serving to limit the backward movement of one section within the other, and the flanges 12 and 13 serving to interlock the several sections when the shield is fully extended.

The shield is secured on the studs 8 and 9 by means of appropriate nuts 16 which screw on to threaded ends of the studs, but the stud 9 receives between the sections 10 of the shield and its nut, the pulley bracket 17, which is maintained in a vertical position by any conventional means for preventing its angular movement on the stud. This means is not shown here and is unessential to an understanding of the invention. The bracket 17 carries a sheave pulley 18 near its upper end, so that the axis of the pulley will be at a higher level than the pivotal point of the sections of the shield.

Tension springs 19 have one end secured one on either side of the foremost section 10, and the remaining ends of these springs are suitably connected to the section 5 of the foremost ring. The tendency of the springs is to keep the shield in extended position.

On that side of the shield at which the pulley 18 is mounted, one end of a cable 20 effects connection with the forward edge of the foremost section 10 of the shield, and this cable is trained over the pulley 18 and carried downwardly toward the chassis frame 2 where it is trained over a pulley 21 whose axis is disposed transversely with reference to the frame of the vehicle A and parallel with the plane of the latter. The pulley 21 is mounted on a bracket 22 designed for detachable connection with the chassis frame 2 to which it is secured by means of a thumb screw 23, the bracket being made in the form of a clamp for engagement with the horizontally disposed flange of an angle iron forming the chassis frame. From the pulley 21, the cable 20 is trained over a pulley 24 mounted on a bracket 25 which is similar to the bracket 22 being secured to the chassis frame 2 in the same way. The pulley 24, has its axis of rotation diagonally disposed, so that the cable 20 after passing thereover may be led in a diagonal direction to permit its passing over a pulley 26 carried in the forward end of a tubular member 27.

The tubular member 27 is preferably square in cross section, and at its rear end is provided with a depending ear 28 designed to set against the inner face of the dash 1 of the vehicle. Coöperating with the ear 28, there is an ear 29 which is made an integral part of an arm 30, the latter being connected with the tubular member 27 on the bottom face of the latter, wherein there is provided a V-slot 31 with which a V-shaped extension 32 formed on the arm 30 slidably engages. Thus the arm 30 is mounted so that it may be moved longitudinally along the tubular member 27 to permit the position of the ear 29 to be varied with respect to the ear 28, thereby providing for the arrangement of the two ears in such spaced relation to each other that they may snugly engage various thickness of dash boards between them. Both ears are provided with appropriate holes, so that they may receive the bolt 33 which, when passing through them, is designed to pass through an appropriate hole formed in the dash also.

The tubular member 27 carries telescoped within it, a bar 34 which is preferably square in cross section and which is provided on its under face with serrations or teeth 35. The bar passes slidably through an appropriate hole formed in the closed rear end of the tubular member, and the teeth 35 are designed to engage on the bottom edge of the opening in the wall closing the end of the tubular member, the teeth being held yieldingly in engagement with this edge as a result of pressure exerted by the flat spring 36 whose one end is secured against the top inner face of the tubular member and whose other end, bears upon the top face of the bar. The rear end of the bar projects from the tubular member and receives thereon, a hand knob 37 to permit its being operated. The hole in the rear end of the tubular member 27 is of such dimensions that the bar 34 may be raised a sufficient distance to permit the teeth 35 to be disengaged from the edge forming the bottom of the hole.

There are two of the pulleys 26 previously referred to, and the two are mounted, one on either side of the forward end of the tubular member 27, their axes being vertical, and the two pulleys standing in spaced relation to each other. This arrangement is provided to permit the cables 20 connected with the shields of the two lamps of the vehicle to be connected in common with the forward end of the bar 34, the latter having an eye 38 at its forward end for the convenient attachment of the ends of the two cables.

In the operation of the invention, the tubular member 27 and its attendant parts are mounted on the front dash of the vehicle, so that the pulleys 26 stand forward as shown in the drawings. When the bar 34 stands wholly within the tubular member 27, that is when the knob member 37 is adjacent to the closed end of the tubular member, the shields B are in their fully extended position to which they are drawn by the springs 19. The lights of the lamps are thus shrouded. Desiring to manipulate the shields, so that the full glare of the lights may be projected onto the roadway over which the vehicle is traveling, the bar member 34 is slightly raised to effect disengagement of the teeth 34, when the bar may be pulled backwardly, thus exerting a pull on the cables 20, causing them to fold up the shields against the tension of the springs 19. The release of the bar then permits reëngagement of certain of the teeth 35, when the shields will be secured in their folded up position.

It is obvious from the construction that the shields may be made to assume various shrouding effects on the light by the proper manipulation of the bar 34, it being possible by means of this bar and its attendant devices to fully extend the shields, or to effect either a complete or a partial folding thereof.

The invention having been described, what is claimed as new and useful is:

1. In a device of the kind set forth, the combination with an auto vehicle having headlights, of sectional shields carried by the headlights and operable to effect different degrees of shrouding of the lights, resilient means tending to move the shields to full shrouding position, a tubular member formed with a clamping element by which it is attached to the dash of the vehicle, the inner end of the tubular member being closed with the exception of a hole provided therein, a bar carried in the tubular member and longitudinally movable therein, the lower edge of the bar being formed with serrations, the rear end of the bar passing through the said hole and any one of the serrations being engageable with the lower edge thereof, a spring carried in the tubular member and bearing on the upper edge of the bar to keep the serrations in engagement with the said head, and flexible connections between said bar and said sectional shields, whereby the movement of the rear end of the bar inward will effect the raising of the shields, the serrations on the bar holding the shields in the desired positions in opposition to the said resilient means.

2. In a device of the kind set forth, the combination with an auto vehicle having headlights, of sectional shields carried by the headlights and operable to effect different degress of shrouding of the lights, resilient means tending to move the shields to full shrouding position, a tubular member formed with a clamping element by which it is attached to the dash of the vehicle, the inner end of the tubular member being closed with the exception of a hole provided therein, a bar carried in the tubular member and longitudinally movable therein, the lower edge of the bar being formed with serrations, the rear end of the bar passing through the said hole and any one of the serrations being engageable with the lower edge thereof, a spring carried in the tubular member and bearing on the upper edge of the bar to keep the serrations in engagement with the said head, a pair of pulleys mounted in the forward end of the tubular member, a plurality of pulleys detachably mounted on the frame of the vehicle, and cables each having one end connected to one of the shields and the remaining end connected to the forward end of said bar, the said cables being trained over the pulleys on the frame and the pulleys in the tubular member, whereby the movement of the rear end of the bar inward will effect the raising of the shields, the serrations on the bar holding the shields in the desired positions in opposition to the said resilient means.

In testimony whereof we affix our signatures.

FELIX BRISBOIS.
JOHN VINCENT KING.